(12) United States Patent
Rafaila et al.

(10) Patent No.: US 10,773,750 B2
(45) Date of Patent: Sep. 15, 2020

(54) DEVICE AND METHOD FOR DETECTING MANUAL GUIDANCE OF A STEERING WHEEL

(71) Applicant: Continental Automotive GmbH, Hannover (DE)

(72) Inventors: Razvan Rafaila, Iasi (RO); Marian George Grosu, Iasi (RO)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/463,506

(22) PCT Filed: Nov. 7, 2017

(86) PCT No.: PCT/DE2017/200117
§ 371 (c)(1),
(2) Date: May 23, 2019

(87) PCT Pub. No.: WO2018/161980
PCT Pub. Date: Sep. 13, 2018

(65) Prior Publication Data
US 2019/0359254 A1 Nov. 28, 2019

(30) Foreign Application Priority Data

Mar. 7, 2017 (DE) .................. 10 2017 203 735
Mar. 7, 2017 (RO) .................. 2017-00139

(51) Int. Cl.
*B60Q 9/00* (2006.01)
*B62D 15/02* (2006.01)
*B62D 6/10* (2006.01)

(52) U.S. Cl.
CPC ............ *B62D 6/10* (2013.01); *B60Q 9/00* (2013.01); *B62D 15/025* (2013.01)

(58) Field of Classification Search
CPC .......... B62D 6/10; B62D 15/025; B60Q 9/00; B60W 40/08; B60W 2540/18; B60W 2510/202; B60W 2050/0056
See application file for complete search history.

(56) References Cited

U.S. PATENT DOCUMENTS

| 4,638,295 A | 1/1987 | Middlebrook et al. |
| 5,335,176 A | 8/1994 | Nakamura |

(Continued)

FOREIGN PATENT DOCUMENTS

| DE | 102004057262 | 6/2006 |
| DE | 102007039332 | 2/2008 |

(Continued)

OTHER PUBLICATIONS

English translation of the International Search Report of the International Searching Authority for International Application PCT/DE2017/200117, dated Feb. 9, 2018, 2 pages, European Patent Office, HV Rijswijk, Netherlands.

(Continued)

*Primary Examiner* — Peter D Nolan
(74) *Attorney, Agent, or Firm* — W. F. Fasse

(57) ABSTRACT

A device (1) and a method for detecting manual guidance of a steering wheel by a driver, have a torque sensor (3) for measuring a steering wheel torque ($T_s$) of the steering wheel; an angular speed sensor (4) for measuring an angular speed ($\omega_c$) of a steering wheel column connected to the steering wheel; and a calculation unit (5) for calculating a driver torque ($T_d$) exerted by the driver on the steering wheel as a function of the measured steering wheel torque ($T_s$) and the measured angular speed ($\omega_c$) of the steering wheel column, and for filtering the calculated driver torque ($T_d$) to deter- (Continued)

mine a steering angle component ($\theta_c^T$) which is compared with a threshold ($\theta_{tol}$) to recognize manual guidance of the steering wheel by the driver.

15 Claims, 3 Drawing Sheets

(56) References Cited

U.S. PATENT DOCUMENTS

| | | | |
|---|---|---|---|
| 5,414,407 A | 5/1995 | Gerrans et al. | |
| 5,712,618 A | 1/1998 | McKenna | |
| 5,742,240 A | 4/1998 | Asanuma et al. | |
| 5,925,082 A | 7/1999 | Shimizu et al. | |
| 6,014,601 A | 1/2000 | Gustafson | |
| 6,114,949 A | 9/2000 | Schmitz et al. | |
| 6,269,308 B1 | 7/2001 | Kodaka et al. | |
| 6,433,679 B1 | 8/2002 | Schmid | |
| 6,498,972 B1 | 12/2002 | Rao et al. | |
| 6,768,933 B2 | 7/2004 | Serezat | |
| 7,119,672 B2 | 10/2006 | Subbaraman | |
| 7,138,909 B2 | 11/2006 | Winner | |
| 7,382,236 B2 | 6/2008 | Maass et al. | |
| 7,486,803 B2 | 2/2009 | Camus | |
| 7,495,550 B2 | 2/2009 | Huang et al. | |
| 7,589,623 B2 | 9/2009 | Oyaide | |
| 7,680,749 B1 | 3/2010 | Golding et al. | |
| 7,792,641 B2 | 9/2010 | Liu et al. | |
| 8,072,370 B2 | 12/2011 | Woodington et al. | |
| 8,095,271 B2 | 1/2012 | Lee | |
| 8,379,923 B2 | 2/2013 | Ishikawa | |
| 8,410,920 B2 | 4/2013 | Ito | |
| 8,447,470 B2* | 5/2013 | Barthomeuf | B62D 5/0457 180/443 |
| 8,564,424 B2 | 10/2013 | Evarts et al. | |
| 8,825,299 B2 | 9/2014 | Iwamoto et al. | |
| 8,880,287 B2* | 11/2014 | Lee | B62D 5/0481 701/34.4 |
| 9,159,221 B1 | 10/2015 | Stantchev | |
| 9,517,719 B2 | 12/2016 | Lueke et al. | |
| 9,573,619 B2 | 2/2017 | Fukunaga et al. | |
| 9,738,307 B2* | 8/2017 | Endo | B62D 5/0466 |
| 9,868,464 B2 | 1/2018 | Lee | |
| 9,889,873 B2 | 2/2018 | Lueke | |
| 10,139,298 B2* | 11/2018 | Kim | G01L 5/221 |
| 10,556,620 B2* | 2/2020 | Kim | B62D 5/0463 |
| 2001/0016798 A1 | 8/2001 | Kodaka et al. | |
| 2002/0017421 A1 | 2/2002 | Stevens | |
| 2003/0144801 A1* | 7/2003 | Braeuchle | B60Q 1/0076 702/56 |
| 2003/0189493 A1 | 10/2003 | Klausner et al. | |
| 2004/0143381 A1 | 7/2004 | Regensburger et al. | |
| 2005/0062597 A1 | 3/2005 | Su | |
| 2005/0150711 A1 | 7/2005 | Burton | |
| 2005/0242965 A1 | 11/2005 | Rieth | |
| 2005/0259158 A1 | 11/2005 | Jacob | |
| 2006/0152346 A1 | 7/2006 | Maass et al. | |
| 2006/0164226 A1 | 7/2006 | Hartle | |
| 2007/0038336 A1 | 2/2007 | Yamamura et al. | |
| 2007/0158593 A1 | 7/2007 | Partin | |
| 2007/0276600 A1 | 11/2007 | King et al. | |
| 2008/0027607 A1 | 1/2008 | Ertl et al. | |
| 2008/0042812 A1 | 2/2008 | Dunsmoir et al. | |
| 2008/0047775 A1 | 2/2008 | Yamazaki | |
| 2008/0186154 A1 | 8/2008 | Haug | |
| 2008/0195292 A1 | 8/2008 | Naab et al. | |
| 2008/0204212 A1 | 8/2008 | Jordan et al. | |
| 2008/0249685 A1 | 10/2008 | Hara et al. | |
| 2009/0024279 A1 | 1/2009 | Takeda et al. | |
| 2009/0037055 A1 | 2/2009 | Danner et al. | |
| 2009/0091435 A1 | 4/2009 | Bolourchi | |
| 2009/0240389 A1 | 9/2009 | Nomura | |
| 2010/0010712 A1 | 1/2010 | Rubia | |
| 2010/0125390 A1 | 5/2010 | Fernandez | |
| 2010/0138112 A1 | 6/2010 | Suzuki | |
| 2011/0010054 A1 | 1/2011 | Wilson-Jones | |
| 2011/0313665 A1 | 12/2011 | Lueke et al. | |
| 2012/0179008 A1 | 7/2012 | Burton | |
| 2012/0197493 A1 | 8/2012 | Fujimoto | |
| 2012/0296528 A1 | 11/2012 | Wellhoefer et al. | |
| 2012/0326735 A1 | 12/2012 | Bennett et al. | |
| 2013/0079991 A1 | 3/2013 | Schmidt | |
| 2013/0151079 A1 | 6/2013 | Sworn | |
| 2013/0158771 A1* | 6/2013 | Kaufmann | B62D 6/00 701/23 |
| 2013/0211677 A1 | 8/2013 | Oblizajek | |
| 2013/0226408 A1 | 8/2013 | Fung | |
| 2014/0160250 A1 | 6/2014 | Pomerantz | |
| 2014/0222295 A1 | 8/2014 | Dornhege | |
| 2014/0249722 A1 | 9/2014 | Hegemann | |
| 2015/0146008 A1 | 5/2015 | Conner | |
| 2015/0298726 A1 | 10/2015 | Aoki | |
| 2015/0344068 A1 | 12/2015 | Taniguchi | |
| 2015/0379362 A1 | 12/2015 | Calmes | |
| 2016/0001814 A1* | 1/2016 | Endo | B62D 5/0466 701/41 |
| 2016/0016606 A1* | 1/2016 | Tsubaki | B62D 6/002 701/41 |
| 2016/0031479 A1 | 2/2016 | Fung | |
| 2016/0114830 A1 | 4/2016 | Dixon | |
| 2016/0121924 A1 | 5/2016 | Norstad | |
| 2017/0129401 A1* | 5/2017 | Matsuoka | B60Q 9/008 |
| 2018/0065661 A1* | 3/2018 | Kim | B62D 6/10 |
| 2018/0172528 A1* | 6/2018 | Kim | G01L 5/221 |

FOREIGN PATENT DOCUMENTS

| | | |
|---|---|---|
| DE | 102008002669 | 1/2010 |
| DE | 102009028647 | 2/2011 |
| DE | 102013113628 | 9/2014 |
| DE | 102015016217 | 6/2016 |
| EP | 0 640 903 | 3/1995 |
| EP | 1 953 065 | 8/2009 |
| EP | 2 591 942 | 5/2013 |
| GB | 2 351 192 | 12/2000 |
| JP | 2003-019973 A | 1/2003 |
| JP | 2004-175122 A | 6/2004 |
| JP | 2008-126808 A | 6/2008 |
| WO | WO 2006/064343 | 6/2006 |
| WO | WO 2014/057671 | 4/2014 |

OTHER PUBLICATIONS

PCT Written Opinion of the International Searching Authority for International Application PCT/DE2017/200117, dated Feb. 9, 2018, 8 pages, European Patent Office, Muenchen, Germany, with partial English translation, 3 pages.

German Search Report for German Patent Application No. 10 2017 203 735.0, dated Sep. 12, 2017, 7 pages, German Patent and Trademark Office, Muenchen, Germany, with partial English translation, 5 pages.

Partial English Summary of Japanese Office Action in Japanese Patent Application No. 2019-521466, dated Sep. 11, 2019, 1 page.

Partial English Summary of Japanese Office Action in Japanese Patent Application No. 2019-521466, dated Jan. 22, 2020, 1 page.

* cited by examiner

DEVICE AND METHOD FOR DETECTING MANUAL GUIDANCE OF A STEERING WHEEL

FIELD OF THE INVENTION

The invention relates to a device and a method for detecting manual guidance of a steering wheel, in particular for a driver assistance system.

BACKGROUND INFORMATION

The steering wheel of a vehicle is developing from merely being a control element into a safety component with a complex requirements specification. Generally, the term 'hand recognition' (hands on/off detection) denotes the recognition of whether or not the driver's hands are located on the steering wheel rim of the steering wheel. In addition to increasing comfort, this detection is also associated with relieving the burden on the vehicle operator.

There are in principle two possibilities for creating a hands on/hands off sensing system. Firstly, it is possible to mount capacitive sensors on the steering wheel in order to establish whether the driver's hands are touching or respectively gripping the steering wheel. The second possibility is providing a torque sensor for measuring a steering wheel torque of the steering wheel, and analyzing a steering wheel torque signal produced by the sensor in order to establish whether the steering wheel is being steered by a driver.

Providing an inherent capacitive sensor for detecting manual guidance of a steering wheel is a relatively elaborate process and is consequently not suited to the mass production of vehicles. The possibility of analyzing a measured torque signal in order to recognize manual guidance of a steering wheel is relatively demanding. The signal produced by the torque sensor can oscillate relatively significantly, in particular as soon as the vehicle drives over potholes in the road or as soon as autonomous driving functions are enabled and assume control of the vehicle.

SUMMARY OF THE INVENTION

It is therefore an object of the present invention to create a device and a method for detecting manual guidance of a steering wheel by a driver, which is robust and reliably detects manual guidance of the steering wheel.

This object can be achieved according to the invention by a device having the features as set forth herein.

The invention therefore creates a device for detecting manual guidance of a steering wheel by a driver, having:
a torque sensor for measuring a steering wheel torque of the steering wheel,
an angular speed sensor for measuring an angular speed of a steering wheel column connected to the steering wheel, and having a calculation unit which calculates a driver torque exerted by the driver on the steering wheel as a function of the measured steering wheel torque and the measured angular speed, and which filters the calculated driver torque in order to determine a steering angle component which is compared with a threshold in order to recognize manual guidance of the steering wheel by the driver.

In one possible embodiment of the detection device according to the invention, the calculation unit has a first filter which filters the steering wheel torque measured by the torque sensor in order to determine an angular speed of the torque sensor.

In another possible embodiment of the detection device according to the invention, the calculation unit has a totalizer which adds the determined angular speed of the torque sensor to the angular speed of the steering wheel column measured by the angular speed sensor in order to produce an angular speed total.

In another possible embodiment of the detection device according to the invention, the calculation unit has a second filter which filters the angular speed total produced by the totalizer in order to calculate the driver torque exerted by the driver on the steering wheel.

In another possible embodiment of the detection device according to the invention, the calculation unit has a third filter which filters the driver torque in order to determine a steering angle component.

In another possible embodiment of the detection device according to the invention, the calculation unit has a comparator which compares the determined steering angle component with the threshold in order to recognize manual guidance of the steering wheel by the driver.

In one possible embodiment of the detection device according to the invention, the filters of the calculation unit are low-pass filters.

In another possible embodiment of the detection device according to the invention, the comparator of the calculation unit sets a flag which indicates whether or not the steering wheel is being manually guided by the driver.

In another possible embodiment of the detection device according to the invention, the flag set by the comparator is evaluated by a control unit in order to warn the driver and/or to prevent automated vehicle interventions.

The above object can further be achieved according to another aspect of the invention, by a method for detecting manual guidance of a steering wheel by a driver, having the features set forth herein.

The invention therefore creates a method for detecting manual guidance of a steering wheel by a driver, having the following steps of:
measuring a steering wheel torque of the steering wheel;
measuring an angular speed of a steering wheel column connected to the steering wheel;
calculating a driver torque exerted by the driver on the steering wheel as a function of the measured torque and the measured angular speed of the steering wheel column connected to the steering wheel;
filtering the calculated driver torque in order to determine a steering angle component occasioned by the driver torque, and
comparing the determined steering angle component with a threshold in order to recognize whether the steering wheel is being manually guided by the driver.

In one possible embodiment of the method according to the invention, the steering wheel torque measured by the torque sensor is filtered in order to determine an angular speed of the torque sensor.

In another possible embodiment of the method according to the invention, the determined angular speed of the torque sensor is added to the measured angular speed of the steering wheel column connected to the steering wheel in order to produce an angular speed total.

In another possible embodiment of the method according to the invention, the produced angular speed total is filtered in order to calculate the driver torque exerted by the driver on the steering wheel.

In another possible embodiment of the method according to the invention, the driver torque is filtered in order to determine a steering angle component.

In another possible embodiment of the method according to the invention, the determined steering angle component is compared with a threshold in order to recognize manual guidance of the steering wheel by the driver.

BRIEF DESCRIPTION OF THE DRAWINGS

Possible embodiments of the detection device according to the invention and of the detection method according to the invention are explained in greater detail below, with reference to the appended figures, wherein.

DETAILED DESCRIPTION OF EXAMPLE EMBODIMENTS OF THE INVENTION

Figure 1:
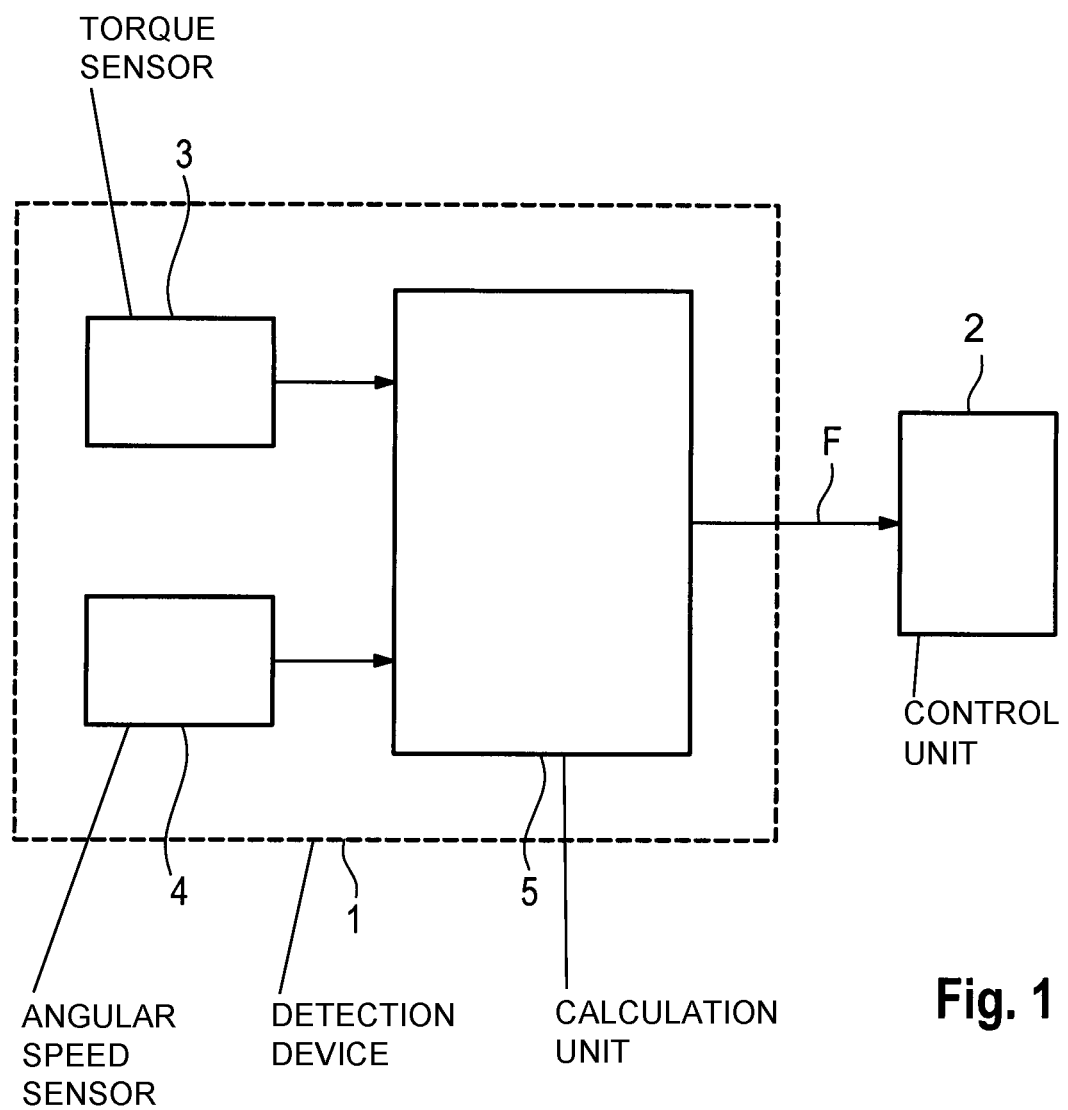
FIG. 1 shows a block diagram in order to represent one embodiment example of a detection device according to the invention.

The block diagram represented in FIG. 1 represents an embodiment example of a device 1 for detecting manual guidance of a steering wheel by a driver. The detection device 1 can be connected on the output side to a control unit 2 of a vehicle.

The detection device 1 comprises, in the represented embodiment example, at least one torque sensor 3 for measuring a steering torque of the steering wheel of the vehicle. Furthermore, the detection device 1 comprises at least one angular speed sensor 4 for measuring an angular speed of a steering wheel column connected to the steering wheel. The two sensors 3, 4 are joined to a calculation unit 5 of the detection device 1. The calculation unit 5 calculates a driver torque exerted by the driver on the steering wheel as a function of the steering wheel torque measured by the torque sensor 3 and as a function of the angular speed measured by the angular speed sensor 4. This calculated driver torque is subsequently filtered by a unit of the calculation unit 5 in order to determine a steering angle component which is compared with a threshold, for example by a comparator of the calculation unit 5, in order to recognize manual guidance of the steering wheel by the driver.

Figure 2:
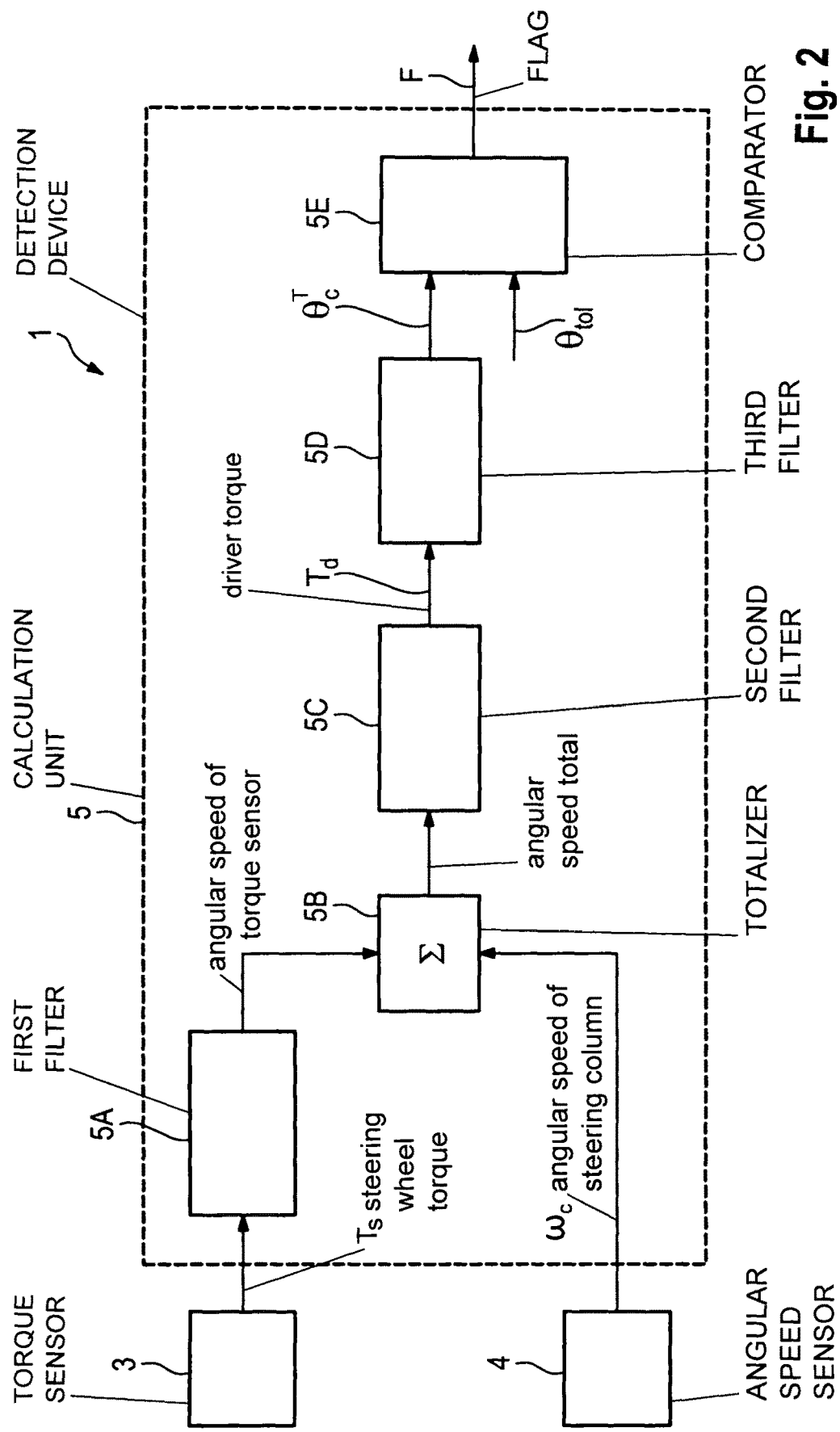
FIG. 2 shows a further block diagram in order to represent one embodiment example of the detection device according to the invention.

The block diagram represented in FIG. 2 shows one embodiment example of a calculation unit 5 contained in the detection device 1. As can be seen in FIG. 2, the calculation unit 5 contains a first filter 5A which filters the steering wheel torque measured by the torque sensor 3 in order to determine an angular speed of the torque sensor 3. This first filter 5A can be a low-pass filter.

The calculation unit 5 additionally has a totalizer 5B which adds the determined angular speed of the torque sensor 3 to the angular speed of the steering wheel column measured by the angular speed sensor 4 in order to produce an angular speed total.

The calculation unit 5 additionally contains a second filter 5C which filters the angular speed total produced by the totalizer 5B in order to calculate the driver torque exerted by the driver on the steering wheel. The second filter 5C can likewise be a low-pass filter. The output signal of the second filter 5C is the driver torque $T_d$ exerted by the driver on the steering wheel. Said driver torque $T_d$ exerted by the driver on the steering wheel is filtered by a third filter 5D, for its part, in order to determine a steering angle component. The third filter 5D can likewise be a low-pass filter.

Furthermore, the calculation unit 5 contains, in the represented embodiment example, a comparator 5E which compares the determined steering angle component $\theta_c^T$ with a threshold $\theta_{tol}$ in order to recognize manual guidance of the steering wheel by the driver. In one possible embodiment, the comparator 5E of the calculation unit 5 sets a flag F which indicates whether or not the steering wheel is being manually guided by the driver. The flag F set by the comparator 5E of the calculation unit 5 can, in one possible embodiment, be supplied to a control unit 2 which evaluates the received flag in order to carry out a driver warning and/or to prevent automated vehicle interventions. These automated vehicle interventions are, for example, controlling or accelerating the vehicle. These can be enabled or disabled as a function of the produced flag F.

Figure 3:
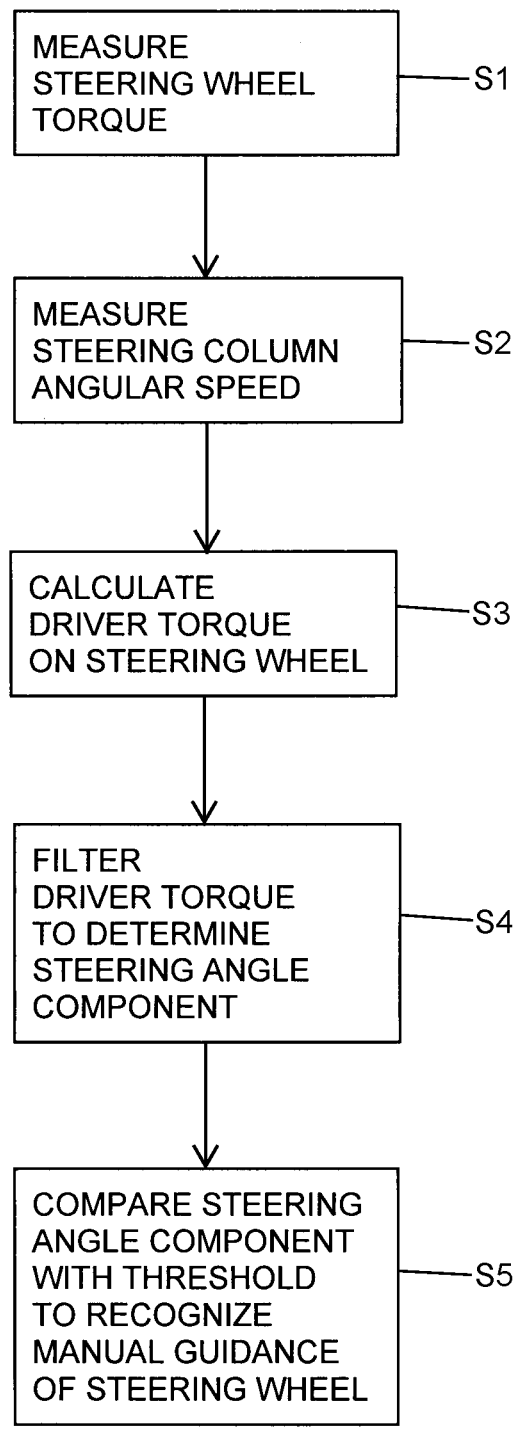
FIG. 3 shows a flowchart in order to represent one embodiment example of a detection method according to the invention.

FIG. 3 shows a flowchart in order to represent one embodiment example of a method according to the invention for detecting manual guidance of a steering wheel by a driver. In the embodiment example represented in FIG. 3, the detection method according to the invention substantially comprises five main steps.

In a first step S1, a steering wheel torque of the steering wheel is measured.

In a further step S2, an angular speed of a steering wheel column connected to the steering wheel is measured.

In a third step S3, a driver torque $T_d$ exerted by the driver on the steering wheel is calculated as a function of the measured torque $T_s$ and the measured angular speed $\omega_c$ of the steering wheel column connected to the steering wheel.

In a further step S4, the calculated driver torque $T_d$ is filtered in order to determine a steering angle component $\theta_c^T$ occasioned by the driver torque $T_d$.

In a further step S5, the steering angle component $\theta_c^T$ determined in step S4 is compared with a threshold $\theta_{tol}$ in order to recognize whether the steering wheel is being manually guided by the driver.

The steering wheel torque $T_s$ of the steering wheel can be measured in step S1, for example with a torque sensor 3 provided for this purpose, as represented in FIGS. 1 and 2. The angular speed $\omega_c$ of a steering wheel column connected to the steering wheel can likewise be measured in step S2 with a corresponding sensor, namely an angular speed sensor 4, as represented in FIGS. 1 and 2.

The steps S3, S4, S5 can be performed by a calculation unit 5, as represented in the embodiment example according to FIG. 2.

The steering wheel torque $T_s$ measured by the torque sensor 3 in the first step S1 can, in one possible embodiment, first be filtered in order to determine an angular speed of the torque sensor 3. This is done, for example, by the first filter 5A of the calculation unit 5 represented in FIG. 2. The determined angular speed of the torque sensor 3 is subsequently added to the angular speed $\omega_c$ of the steering wheel column connected to the steering wheel measured in step S2 in order to produce an angular speed total. This is done, for example, with the totalizer 5B of the calculation unit 5 represented in FIG. 2. The angular speed total produced by the totalizer can subsequently be filtered in order to calculate the driver torque $T_s$ exerted by the driver on the steering wheel. This is effected, for example, with the second filter 5C of the calculation unit represented in FIG. 2. The produced driver torque can subsequently be filtered in order to determine a steering angle component $\theta_c^T$. This is effected, for example, with the third filter 5D represented in FIG. 2. Finally, the determined steering angle component $\theta_c^T$ is compared with a predefined threshold $\theta_{tol}$ in step S5 in order to recognize manual guidance of the steering wheel by the driver.

Manual guidance of a steering wheel based on a driver torque exerted by the driver on the steering wheel is detected with the method according to the invention. This can take place using a transfer function which describes the system dynamics. The detection method according to the invention can, in one possible embodiment, be effected by means of an algorithm executed by the calculation unit 5. This detection algorithm can be implemented as follows in one possible embodiment.

Measuring the steering wheel torque $T_s$ with the torque sensor;

Measuring the angular speed $\omega_c$ of a steering wheel column connected to the steering wheel with an angular speed sensor;

Applying a transfer function in order to obtain an estimate for the driver torque $T_d$ exerted on the steering wheel;

Filtering the estimated driver torque $T_d$ with a second transfer function in order to obtain a steering angle component $\theta_c^T$;

--- if $|\theta_c^T| \leq \theta_{tol}$, then
  hands off detection;
otherwise (else) hands on sensed.
End if.

---

In the implementation example of the algorithm indicated above, the threshold $\theta_{tol}$ represents a tolerance parameter. This is provided in order to take account of the noise occurring during the measurement of the numerical calculation. Ideally, this tolerance parameter is $\theta_{tol}=0$ [rad]. In a practical implementation, this tolerance parameter $\theta_{tol}$ can be adjusted depending on the desired detection accuracy.

The calculation unit 5 comprises three filters 5A, 5C, 5D in the embodiment represented in FIG. 2. These filters are preferably low-pass filters. In one possible embodiment, these are passive digital low-pass filters.

The hand detection method according to the invention is based on the dynamic behavior of an electrical steering system.

This dynamic behavior can be represented as follows:

$$J_c \ddot{\theta}_c = -K_c \theta_c - B_c \dot{\theta}_c + K_c \frac{\theta_m}{N} - F_c \text{sign}(\dot{\theta}_c) + T_d \quad (1)$$

$$J_{eq} \ddot{\theta}_m = K_c \frac{\theta_c}{N} - K_{eq} \theta_m - B_{eq} \dot{\theta}_m + K_t i_m - F_m \text{sign}(\dot{\theta}_m) - \frac{R_p}{N} F_r, \quad (2)$$

wherein $\theta_c$ represents the steering wheel column angle, $\theta_m$ represents the angle of the electric motor, $i_m$ represents the electric motor current, $F_r$ represents the reaction force of the road, which acts on the control system, and $T_d$ represents the torque exerted by the driver.

The parameters represented in the equations (1), (2) are as follows:

$J_c$ is the moment of inertia of the steering column, $B_c$ is the dampening coefficient of the steering column, $K_c$ is the stiffness of the steering column, $F_c$ is the friction of the steering column, $N$ is the transmission ratio of the electric motor, $R_p$ is the steering column radius, $K_t$ is a torque constant of the electric motor, $J_{eq}$ is the equivalent inertia of the lower part of the EPS system, which is composed of the inertia of the electric motor and the control system mass, $B_{eq}$ is the equivalent dampening factor of the lower part of the EPS system, which is composed of the viscous dampening of the electric motor and the viscous dampening of the steering system, $K_{eq}$ is the equivalent stiffness of the lower part of the EPS system, which is composed of the suspension rate of the tire and the stiffness of the steering column, and $F_m$ is the motor friction coefficient.

The above equation (1) describes the dynamics of the upper part of the steering column which has the steering wheel and the steering sensor. The second equation (2) combines the dynamics of the motor and the rack. Neglecting the column friction component, the equation (1) can be rewritten as follows:

$$J_c \ddot{\theta}_c + B_c \dot{\theta}_c + K_c \theta_c = K_c \frac{\theta_m}{N} + T_d \quad (3)$$

Using a Laplace transform, the equation (3) can be indicated as follows:

$$J_c s^2 \theta_c(s) + B_c s \theta_c(s) + K_c \theta_c(s) = K_c \frac{\theta_m(s)}{N} + T_d(s) \quad (4)$$

Starting from equation (4), the dynamics of the steering column can be indicated with the following transfer function:

$$\theta_c(s) = \frac{K_c/N}{J_c s^2 + B_c s + K_c} \theta_m(s) + \frac{1}{J_c s^2 + B_c s + K_c} T_d(s), \quad (5)$$

wherein the steering column angle $\theta_c$ is considered to be an output, whereas the motor angle $\theta_m$ and the torque $T_d$ applied by the driver represent the two inputs and have an influence on the steering column angle $\theta_c$.

Starting from equation (5), two different angle components can be observed. One angle component is generated by the motor angle $\theta_m$, i.e.:

$$\theta_c^m(s) \stackrel{\text{def}}{=} \frac{K_c/N}{J_c s^2 + B_c s + K_c} \theta_m(s) \quad (6)$$

and a different angle component is generated by the driver torque $T_d$:

$$\theta_c^T(s) \stackrel{\text{def}}{=} \frac{1}{J_c s^2 + B_c s + K_c} T_d(s) \quad (7)$$

As can be seen in equation (2), the motor angle depends on two inputs, namely the motor current $i_m$ which is used by the steering controller in order to generate the torque which is required for assisting the steering by the driver or for autonomous driving, and the road or respectively subsurface reaction force $F_r$ which represents the force that is produced by the contact between the road and the wheels. If the vehicle is automatically controlled or the control wheels roll over road potholes, the motor angle is influenced. This adds the angle component $\theta_c^T$ in the steering wheel angle $\theta_c$ and does not influence the angle component $\theta_c^T$. In this way, potholes or irregularities in the road as well as automatic steering maneuvers influence the steering wheel angle by the motor angle $\theta_m$.

On the basis of equations (5), (6) and (7) it is possible to decouple the influence or respectively the effects which can be recognized in the steering torque measurement, if automatic steering maneuvers or reaction forces of the road are present, by simply analyzing the angle component which is induced or respectively occasioned by the motor torque Or.

As is clear from equation (7), it can be concluded that as soon as the torque exerted by the driver becomes 0 [$N_m$], the driver has removed his hands from the steering wheel. By analyzing the effect of the driver torque with the steering wheel angle $\theta_c$, i.e. the amplitude of the angle component $\theta_c^T$, it is possible to detect or respectively establish whether or not the driver's hands are located on the steering wheel. As soon as this current or respectively instantaneous torque $T_d$ exerted by the driver is obtained, it is possible to carry out reliable manual guidance detection.

In order to determine or respectively estimate the driver torque $T_d$ exerted by the driver on the steering wheel, the model indicated in equation (1) can be used. Neglecting the non-linear friction component, the equation can be indicated as follows:

$$J_c \ddot{\theta}_c + B_c \dot{\theta}_c = -K_c \left( \theta_c - \frac{\theta_m}{N} \right) + T_d \quad (8)$$

The first term on the right side of the equation represents the torque which is measured by the torque sensor 3. This can then be written as follows:

$$T_s = K_c \left( \theta_c - \frac{\theta_m}{N} \right) \quad (9)$$

Hence, the equation (8) can be rewritten as follows:

$$J_c \ddot{\theta}_c + B_c \dot{\theta}_c = T_d - T_s \quad (10)$$

Using a Laplace transform and bearing in mind that $\dot{\theta}_c = \omega_c$, a transfer function can be determined as follows:

$$\omega_c(s) = \frac{1}{J_c s + B_c} T_d(s) - \frac{1}{J_c s + B_c} T_s(s) \quad (11)$$

The current or respectively instantaneous driver torque $T_d$ can then be derived by equation (11) as follows:

$$\left[ \omega_c(s) + \frac{1}{J_c s + B_c} T_s(s) \right] = \frac{1}{J_c s + B_c} T_d(s) \quad (12)$$

In order to eliminate the dynamics which are introduced by the transfer function on the right side of the equation (12), the equation (12) can be multiplied by the inverse of this transfer function. Using a low-pass filter, the driver torque $T_d$ can be indicated as follows:

$$\frac{(J_c s + B_c)(b_m s^m + b_{m-1} s^{m-1} + \ldots + b_1 s + 1)}{a_n s^n + a_{n-1} s^{n-1} + \ldots + a_1 s + 1} \left[ \omega_c(s) + \frac{1}{J_c s + B_c} T_s(s) \right] = T_d(s), \quad (13)$$

wherein $a_1, \ldots a_n, b_1, \ldots b_m \in \mathbb{R}$ are real coefficients of the relevant filter and wherein the order of the filter is indicated by n, m$\in \mathbb{N}$, wherein n$\geq$m+1.

The calculation unit 5 produces a flag F which indicates whether the driver has his hands on the steering wheel or whether he has taken his hands off the steering wheel. For example, a flag F=0 indicates that the driver's hands are located on the steering wheel, whereas a flag F=1 indicates that the driver's hands have been removed from the steering wheel. The filter indicated in equation (13) can, for example, be implemented as a simple low-pass filter of the second order $$\frac{1}{(0.07s + 1)(0.07s + 1)}.$$

The detection method according to the invention is based on a precise model for estimating or respectively calculating the current driver torque exerted on the steering wheel. By transforming the driver torque signal into an angle component of the steering wheel, a simple quantification and adjustment or respectively adaptation can be effected. The method according to the invention does not require any complex decision logic in order to establish whether or not the driver's hands are located on the steering wheel. The method according to the invention is extremely robust with respect to external influences, in particular with respect to those influences which affect the measurement of the steering torque sensor. The method according to the invention simply requires two measuring signals, namely a measured steering wheel torque of the steering wheel and a measured angular speed of a steering wheel column connected to the steering wheel. Both these measuring signals are already present in most vehicle systems. Therefore, the method according to the invention and the device according to the invention for detecting manual guidance of a steering wheel have the particular advantage that no further sensors have to be provided in order to be able to carry out the desired detection of manual guidance of a steering wheel. Therefore, the technical outlay for implementing this detection method according to the invention and the detection device 1 according to the invention is relatively low.

The flag produced by the calculation unit 5 of the detection device 1 can be supplied to further control units of a driver assistance system. As a function of the flag, the driver can be given a warning for example. Furthermore, particular automated vehicle interventions can be automatically prevented as a function of the set flag.

The invention claimed is:
1. A device for detecting manual guidance of a steering wheel by a driver, comprising:
 (a) a torque sensor configured to measure a steering wheel torque of the steering wheel;
 (b) an angular speed sensor configured to measure an angular speed of a steering wheel column connected to the steering wheel; and
 (c) a calculation unit configured to calculate a driver torque exerted by the driver on the steering wheel as a function of the steering wheel torque and the angular speed of the steering wheel column, and configured to filter the driver torque to determine a steering angle component, and configured to compare the steering angle component with a threshold to recognize manual guidance of the steering wheel by the driver.

2. The device according to claim 1, wherein the calculation unit comprises a first filter configured to filter the steering wheel torque measured by the torque sensor to determine an angular speed of the torque sensor.

3. The device according to claim 2, wherein the calculation unit further comprises a totalizer configured to add the angular speed of the torque sensor to the angular speed of the steering wheel column to produce an angular speed total.

4. The device according to claim 3, wherein the calculation unit further comprises a second filter configured to filter the angular speed total to calculate the driver torque exerted by the driver on the steering wheel.

5. The device according to claim 4, wherein the calculation unit further comprises a third filter configured to filter the driver torque to determine the steering angle component.

6. The device according to claim 5, wherein the calculation unit further comprises a comparator configured to compare the steering angle component with the threshold to recognize the manual guidance of the steering wheel by the driver.

7. The device according to claim 6, wherein the comparator is configured to set a flag that indicates whether or not the manual guidance of the steering wheel by the driver has been recognized.

8. The device according to claim 7, further comprising a control unit configured to evaluate the flag to warn the driver and/or to prevent automated vehicle interventions.

9. The device according to claim 1, wherein the calculation unit comprises one or more low-pass filters.

10. The device according to claim 1, wherein the calculation unit is configured to calculate the driver torque as a function of only the steering wheel torque and the angular speed of the steering wheel column.

11. A method of detecting manual guidance of a steering wheel by a driver, comprising the steps:
(a) measuring a steering wheel torque of the steering wheel;
(b) measuring an angular speed of a steering wheel column connected to the steering wheel;
(c) calculating a driver torque exerted by the driver on the steering wheel as a function of the steering wheel torque and the angular speed of the steering wheel column;
(d) filtering the driver torque to determine a steering angle component caused by the driver torque; and
(e) comparing the steering angle component with a threshold to recognize manual guidance of the steering wheel by the driver.

12. The method according to claim 11, wherein the measuring of the steering wheel torque is performed by a torque sensor, and further comprising filtering the steering wheel torque to determine an angular speed of the torque sensor.

13. The method according to claim 12, further comprising adding the angular speed of the torque sensor to the angular speed of the steering wheel column to produce an angular speed total.

14. The method according to claim 13, wherein the calculating of the driver torque comprises filtering the angular speed total.

15. The method according to claim 12, wherein the driver torque is calculated as a function of only the steering wheel torque and the angular speed of the steering wheel column.

* * * * *

UNITED STATES PATENT AND TRADEMARK OFFICE
CERTIFICATE OF CORRECTION

PATENT NO. : 10,773,750 B2
APPLICATION NO. : 16/463506
DATED : September 15, 2020
INVENTOR(S) : Razvan Rafaila et al.

It is certified that error appears in the above-identified patent and that said Letters Patent is hereby corrected as shown below:

On the Title Page

Page 2 Item (56), right column, FOREIGN PATENT DOCUMENTS:
Line 6, after "EP 1 953 065", replace "8/2009" with -- 8/2008 --;

In the Specification

Column 7,
Line 13, after "motor torque", replace "Or" with -- $\theta_c^T$ --;
Line 46, replace the equation to read: "$J_c \ddot{\theta}_c + B_c \dot{\theta}_c = T_d - T_s$   (10)".

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*